(No Model.)

M. RENZ.
NUT CRACKER.

No. 246,034.  Patented Aug. 23, 1881.

WITNESSES:
Carl Karp
Otto Risch

INVENTOR
Mitchell Renz
BY Paul Goepel
ATTORNEY

UNITED STATES PATENT OFFICE.

MITCHELL RENZ, OF BRIDGEPORT, CONNECTICUT.

NUT-CRACKER.

SPECIFICATION forming part of Letters Patent No. 246,034, dated August 23, 1881.

Application filed December 15, 1880. (No model.)

*To all whom it may concern:*

Be it known that I, MITCHELL RENZ, of the city of Bridgeport, in the county of Fairfield and State of Connecticut, have invented certain new and useful Improvements in Nut-Crackers, of which the following is a specification.

This invention relates to an improved nut-cracker with two movable jaws which are worked simultaneously, in connection with fulcrumed handles, so as to give great power to the jaws and adapt them readily for cracking nuts of large and small size.

The invention consists of two movable jaws, which are jointed at their outer ends and pivoted at their inner curved ends to fulcrumed handles, which are, furthermore, below the fulcrum provided with inner smaller jaws.

Figure 1:
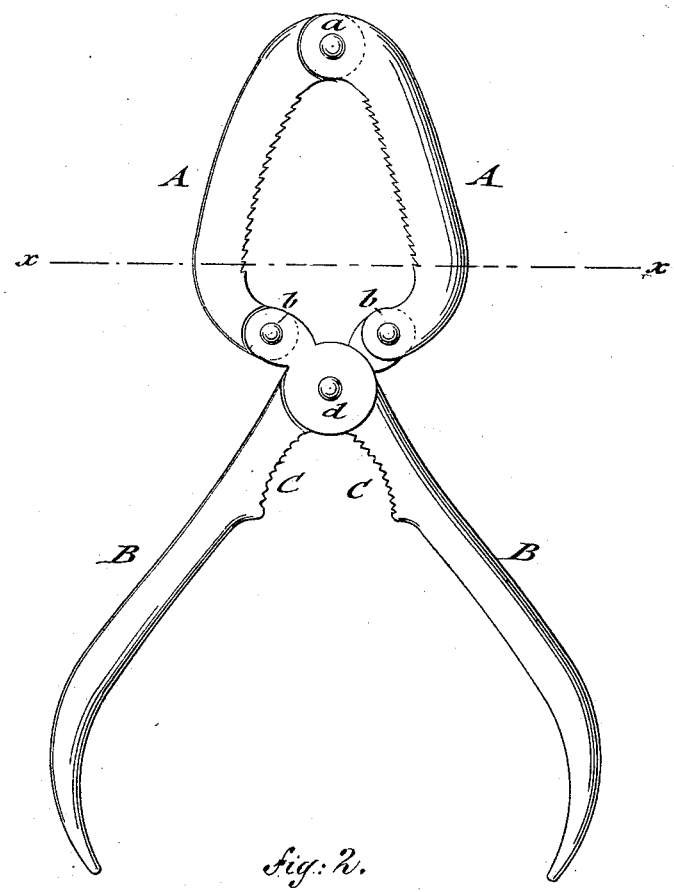
Figure 2:
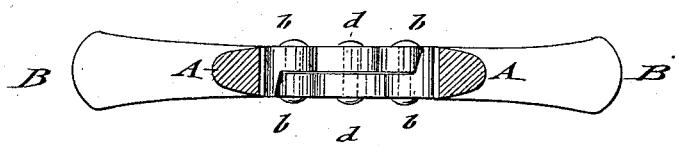

In the accompanying drawings, Figure 1 represents a side elevation of my improved nut-cracker; and Fig. 2 is a horizontal section of the same on line $x$ $x$, Fig. 1.

Similar letters of reference indicate corresponding parts.

A A in the drawings represent two movable jaws, which are jointed at their outer ends by a connecting-pivot, $a$, and at their opposite inwardly-curved ends by pivots $b$ to handles B B, which are fulcrumed to each other at a short distance from the pivot-connection with the movable jaws A A. The jaws A A are roughened or serrated at their inner faces, for properly taking hold of the nuts. The handles B B are also provided at their inside, below their fulcrum $d$, with smaller concaved and ribbed jaws C C, which may be used for cracking smaller nuts, such as hazel-nuts, &c.

By opening the handles of the implement the movable jaws are spread apart, so that nuts of any size may be readily inserted between the same and cracked by the closing of the jaws, on the approach of the handles toward each other, by the pressure of the hand. The considerable leverage obtained by the handle facilitates the cracking of the nuts and admits the opening of very hard and tough nuts with comparatively little exertion. In cracking the nuts both jaws are moved simultaneously, so as to act with equal power upon both sides of the nuts. The implement may also be conveniently used for compressing large and small corks, which is an additional feature of my nut-cracker, which, furthermore, presents a neat appearance, owing to the symmetrical arrangement of the handles and jaws.

I am aware that nut-crackers with a fixed and a movable jaw, jointed together at the outer ends and operated by a rigid handle-extension of one jaw and by a jointed handle linked to the movable jaw, have been used heretofore, and I lay, therefore, no claim to the same. They have, however, the disadvantage that one handle and one jaw swing toward the rigid handle and jaw, which does not admit the easy grasp by the hand, which forms the main advantage of my cracker, by which an equal pressure is exerted on both handles, and consequently by both jaws on the nut, so as to crack the same in an easier manner.

Having thus described my invention, I claim as new and desire to secure by Letters Patent—

In a nut-cracker, the combination of the movable jaws, which are jointed together at their outer ends, with fulcrumed handles, which are pivoted to the opposite inner ends of the movable jaws and provided with smaller inside jaws below the fulcrum, substantially as set forth.

In testimony that I claim the foregoing as my invention I have signed my name, in presence of two witnesses, this 13th day of December, 1880.

MITCHELL RENZ.

Witnesses:
ANDREW RENZ,
J. B. CUZNER.